United States Patent [19]

Massey

[11] 4,441,944
[45] Apr. 10, 1984

[54] BUILDING BOARD COMPOSITION AND METHOD OF MAKING SAME

[75] Inventor: David H. Massey, Winnetka, Ill.

[73] Assignee: PMP Corporation, Mundelein, Ill.

[21] Appl. No.: 336,498

[22] Filed: Dec. 31, 1981

[51] Int. Cl.³ ............................ F04B 2/00; B05D 3/02
[52] U.S. Cl. .................................. 156/71; 52/309.17; 427/245; 427/403
[58] Field of Search ........................ 106/97, DIG. 1; 427/403, 245; 156/71; 52/309.17, 309.4, 309.7, 309.13, 309.16; 523/218; 521/81, 82, 100; 524/5

[56] References Cited

U.S. PATENT DOCUMENTS

| | | | |
|---|---|---|---|
| 3,677,878 | 1/1972 | Carlson | 427/403 |
| 3,917,547 | 11/1975 | Massey | 428/406 X |
| 3,991,252 | 11/1976 | Kolakowski et al. | 427/403 X |
| 4,341,562 | 7/1982 | Ahlbeck | 106/97 |
| 4,344,796 | 8/1982 | Minnick | 106/97 X |

Primary Examiner—Thurman K. Page
Attorney, Agent, or Firm—Neuman, Williams, Anderson & Olson

[57] ABSTRACT

Novel liquid cementitious slurry coating compositions of portland cement, flyash and polymeric emulsions and optionally containing liquid foam and/or reinforcing fibers are applied to solid cellular monoliths to make weather resistant insulative construction boards and units. The slurry coatings are prepared and applied to the surface(s) of cellular monoliths such as beadboard by roller coating, spraying, or the like, allowed to dry and cure. The density of the coatings can be reduced by foaming of the polymeric emulsion and/or by the incorporation of liquid foam into the slurry mix.

Varying surface effects may be impressed on the surface of the damp coating prior to drying and curing to produce building or construction units with high insulation properties, weather resistance, and impact resistance characteristics.

7 Claims, No Drawings

BUILDING BOARD COMPOSITION AND METHOD OF MAKING SAME

BACKGROUND OF THE INVENTION

1. Field of the Invention

This invention relates to insulated building boards having a fire-resistant cementitious coating composition and compositions and methods for making the same.

2. Description of the Prior Art

Cementitious compositions comprised of portland cement and from 30–55% by weight of cenospheres (cellular glass particles derived from flyash) are disclosed in British Patent No. 1,514,239. In that patent, the portland cement-cenosphere composition are formed into a slurry with water and the mixture together with glass fibers is sprayed on a vacuum bed mold surface followed by dewatering to form a sheet which is then removed and left to cure and dry. That patent also discloses the impregnation of the dry, but partially cured sheet, by monomers and catalysts followed by heating to effect polymerization of the monomer. Methylmethacrylate is disclosed as a particularly useful monomer for this purpose.

The use of cenospheres in flexible polymeric polyurethane foams is disclosed in U.S. Pat. No. 3,917,547 patented Nov. 4, 1975. In that patent, polyurethane or other flexible foams are blended with flyash containing a substantial amount of cenospheres which are present in the composition in amounts of from between about 5 and 75% by volume.

SUMMARY OF THE INVENTION

The present invention relates broadly to cementitious compositions and insulating boards coated therewith. The cementitious compositions broadly comprise a portland cement, a polymeric emulsion flyash optionally containing cenospheres or a solid cellular such as cellular foam-like polymeric particles, and optionally liquid aqueous based foams, and fibrous reinforcing material.

In one preferred broad form, the said compositions comprise a slurry containing, in the liquid and uncured state, from about 10 to 70 parts by volume of portland cement, from 10 to 70 parts of flyash optionally containing solid cellular particles such as cenospheres, from 10 to 70 parts of a polymeric emulsion, from 0 to 80 parts and preferably from 5 to 80 parts of fibrous reinforcing materials and in some variations from about 10 to 30 parts by volume of liquid foam (before foaming) and from 1½ to 50 times those values after foaming or on the foamed product from 15–500 parts by volume.

In one broad form the cementitious coating compositions of the present invention comprise a portland cement, flyash and a polymeric emulsion.

More particularly, the compositions broadly comprise from 10 to 70 parts by volume of a portland cement from 10 to 70 parts of flyash and from 10 to 70 parts of an aqueous based polymeric emulsion all of said parts being on a volume basis.

In one modified form the said compositions also include from zero (0) to 80 parts, preferably from 5 to 80 parts by volume of fibrous reinforcing material, such as fiberglass fibers.

The instant compositions also include light-weight low or reduced density cellular insulating compositions which are achieved by the inclusion therein of solid cellular materials and/or by the inclusion in said compositions in their liquid uncured slurry state of liquid aqueous based foams to provide as in the case of the solid cellular additives, cellular voids in the final dried and cured composition. In one such modification the polymeric emulsion may be whipped to entrain air and thereby produce a foam which has a wet density of from 2 to 30 lbs/cu. ft. In another modification, an aqueous based stable liquid foam is separately added to the composition in an amount of from 10 to 20 parts by volume of the aqueous based liquid foaming agent which has been foamed to entrain air and increase the volume thereof by a factor of from 1½ to 50 times the volume of the said liquid foaming agent or otherwise stated added to said compositions in volumes, but so as not to exceed 90% by volume of the total mix to achieve a product having a final dried density of 10 to 60 lbs./cu. ft. The foam may be employed as its sole density reducing component alone or in conjunction with the foamed polymeric emulsion or in conjunction with solid cellular components such as cenospheres in flyash or in any combination of these expedients to achieve a reduced density and improved insulative characteristics.

The solid cellular or foam-like particles employed are preferably cenospheres normally present in flyash which may be contained therein in substantial amounts. The cenospheres, which average from 10 to 200 microns in diameter, are coherent, non-porous glass-like shells or spheres formed primarily of silica and/or various other metal oxides and having a spherical shell that is characterized by rough areas on the outer surfaces that are about one-tenth of the radius of the cenosphere particle. The true particle density of the cenospheres is in the range of 15 to 50 pounds per cubic foot and the random bulk density is in the range of 10 to 40 pounds per cubic foot. Flyash usually contains from about 5 to about 30% by weight of the cenospheres but may be concentrated by flotation or other techniques to contain from about 30 to 50 or even up to 100% cenospheres. The foregoing compositions are applied to a surface or more surfaces of cellular polymeric board or sheets such as styrene beadboad, dried and cured.

In this context, it should be noted that the insulation boards of the present invention coated with the aforenoted cementitious compositions will vary in their properties depending upon the proportion of cenospheres present. Thus, for example, where a high impact insulating board is required the cementitious composition will contain overall about 10% by volume of flyash containing little or no cenospheres. For high flame resistance and the lightest weight and greatest insulating properties from about 50 to 60% by volume of flyash containing as much as 90% cenospheres is used in the cementitious composition employed as a coating on the insulating boards of the invention. Liquid foam added to the slurry also produces a lower density more insulative coating. This latter type of board construction with a highly cellular coating on the surface thereof produces a product that is more readily sawn, cut, or nailed. The preferred amount of flyash in most cases is between about 35 and 40% by overall volume in the total cementitious composition on a volume basis.

The polymeric latex or emulsion employed in the cementitious composition of the invention is preferably used in amounts of from about 10 to about 30% by volume. They are preferably aqueous based acrylic latices in dispersion or emulsion form, exemplary of which are Rohm & Haas, acrylic emulsions, or latices, such as MC-76 or LC-67 which is a somewhat softer acrylic polymer latex or dispersion, although other polymeric latices of small particle size may also be used for this purpose.

The fibers which are employed as a reinforcing additive are in one preferred embodiment a chop of glass fibers having a length of from about 1½ to 2" although fiber lengths as short as 1/32" to ¼" may be employed and fiber lengths somewhat greater than 2" may also be used as well as continuous filaments. The glass fibers may in another preferred embodiment be in the form of continuous filament such as a "swirl mat" or as a "scrim" or other similar loosely woven mat.

In addition to fiberglass fibers, organic fibers may also be employed such as for example orlon, nylon, polypropylene, or other inert high tensile strength, organic or in some cases inorganic based, fibrous strands. When glass fibers are used, particularly the swirl mat form, they are preferably pre-soaked in polymeric emulsion so as to render them resistant to attack by the calcium hydroxide generated in the portland cement slurry.

In those cases where surface textures are required, the desired relief effects can be pressed into the uncured material. If desired, after an initial drying or curing of the coating with those reliefs in place, then roller coating techniques can be employed using varying diameters and durometers of roller surfaces can be used to apply coatings of varying color effects using pigmented coating preferably based on the cementitious compositions herein disclosed with pigments added.

The liquid foam employed in the making of the foamed cementitious composition is formed of water and a foam forming and stabilizing agent such as for example, a soap or similar material. Rosin soaps are particularly useful for this purpose exemplified in the product sold by the Waukesha, division of Abex Corporation under the tradename WX304. In making the stabilized liquid foam, a small amount of the soap-like or similar foaming and stabilizing agent is admixed with a large volume of water. Typical amounts would be from about 1½ to about 3½% of the foaming agent and the balance to make a 100% of water, with about 2½% being the most preferred amount.

The amount of water that is employed in these compositions is variable in the sense that usually the polymeric emulsion employed has sufficient water in it being on the order of 50% solids and the balance (to 100%) water, to satisfy the water-of-hydration requirements of the portland cement. If required however, additional water may be added to satisfy those hydration requirements as well as to adjust the viscosity and handling requirements of the composition. The water added may be in the range of from about 15 to about 30% of the cementitious slurry composition. In that context, it should be noted that these compositions frequently employ portland cement curing accelerators which generally contain sodium carbonate or calcium chloride and other additives. Exemplary of a calcium chloride accelerators is the product sold under the tradename Anti-Hydro by the Anti-Hydro Company. Generally speaking, these accelerators are used in relatively small amounts, e.g. less than 5% by volume to the cement.

In addition to the major components discussed above, the slurry composition may also contain minor amounts of various wetting agents, emulsifiers, or the like, which also act as foaming agents for the polymeric emulsion in the first pre-mix. These are usually polyhydroxy alcohols, such as for example, 12–14 carbon atom alcohols, Oxitol which is a ethylene glycol monoethyl ether based surfactant sold by the Shell Chemical Co., Zonyl FSN a fluorocarbon surfactant sold by the E. I. duPont de Nemours Company, and Triton X405 a surfactant and emulsifier sold by the Rohm & Haas Company.

Generally these emulsifying and/or wetting agents are used to provide a stabilized foam in the first pre-mix as well as to also provide even and uniform dispersion of the solid materials in the cementitious slurry of the second pre-mix and to stabilize the same against precipitation, collapse or settling, prior to setting up and/or curing.

Viscosity adjusting additives may also be used in small amounts, such as hydroxyethyl cellulose or hydroxymethyl cellulose which are usually added to the mix as a pre-mix in cold water for the same purposes, to provide a uniform mix of the desired viscosity and handling properties.

The cementitious compositions of the present invention will vary in density depending upon how much solid or liquid foam particles are added to the mix. Broadly, densities of the cured coating product will range from about 10 to 90 pounds per cubic foot. Larger amounts and proportions of solid cellular foam materials such as flyash containing a high percentage of cenospheres or other solid foam-like materials, such as for example styrene or other polymeric beads, tend to reduce the final density of the dried and cured cementitious coating composition, as does any additions of liquid foam to the mixture in the slurry state which results in coating densities of from 10 to 60 lbs/cu. ft. The liquid foam bubbles when present, leave cellular voids in the coating composition in the dried or cured state and thereby reduce the density of the coating or product to the levels indicated.

The cementitious slurry compositions of the present invention in the wet or uncured state may range from a quite fluid slurry material to a trowlable putty, which compositions when dried and cured may range from rigid products having a rigid and hard surface to a somewhat more flexible surface having good impact characteristics and resistant to cracking or crazing on high impact.

The method of preparing the foamed cementitious compositions of the present invention involves forming a series of pre-mixes which are sequentially blended together to form the final product.

Thus, for example, a first, wet pre-mix is prepared of the aqueous polymeric emulsion, a water solution of the hydroxyethyl cellulose viscosity regulator as a preliminary pre-mix or dispersion and the surface active agents employed as well as any portland cement cure accelerators that may be used. All of these materials are either liquids or liquid based such as the polymeric dispersion. This first pre-mix may be whipped to entrain air.

A second pre-mix of the dry ingredients such as the portland cement and the flyash containing cenospheres and/or solid foamed polymeric additives such as individual foamed styrene beads forming a second or dry pre-mix.

The first and second pre-mixes are blended together. In the event that a low density coating composition is desired, a third foam pre-mix of a liquid foam is prepared by adding a protein or soap-based foaming agent to water, which is beaten or whipped to entrain air and form a foam of the desired density and volume as a third or "foamed" pre-mix.

This foam pre-mix is then blended with the admixture of the first and second pre-mixes described above. It may then be applied as a coating to at least one major surface of a sheet-like insulating board. The insulating board may be of any desired thickness, conventionally ranging however from about ⅜ or ½" up to 4" in thickness or may be a cylinder which is coated on its side surface. Generally, the insulating board may be made of foam polyurethane, styrene bead board, or other cellular light-weight insulating type materials including fibrous cellulose, or the like.

Generally the coating is applied and leveled by means of a doctor blade, but spraying or other means of applying a thin uniform layer of the cementitious slurry coating composition to the surface(s) of the insulating board material may also be carried out. The coating is then permitted to dry and cure.

When fibers are used they may be introduced into the composition with the pre-mixes as part of the solids or more desirably by depositing the same on the slurry coating in the wet state. They may also be applied to the wet slurry coating as a loosely woven "swirl" mat or scrim. When a swirl mat or scrim is used, it is especially beneficial to pre-soak or wet the same in the polymeric emulsion as indicated above. The same treatement can be applied to the chopped fibers.

The thickness of the coating is variable but generally thickness of from about 1/16 to as much as about ¾ inch or about 1.5 to about 20 millimeters is satisfactory.

While the cementitious coating slurry may be applied to the cellular board as a smooth layer, various patterns may be pressed or formed into the damp coating layer after partial drying, including patterns to simulate trowled stucco, raked or scored patterns, patterns to simulate woodgrain, shingles or patterns simulating laid brick or stone wall surfaces. Pigments may also be added to achieve the desired colors of stone or brick. In those cases where brick or stone simulating surfaces are required, the desired relief is pressed into the damp uncured coating that has been applied to the insulating board and after drying and, if desired, further curing, the high relief surfaces are coated with the slurry in thinned down form and then further dried and cured. Pigments to achieve the desired color can also be added to the supplemental coating. If desired, board-like elongated sheets of insulating material may be employed to represent boards or Dolly Varden siding used on exterior building surfaces. In such a case, one major exterior flat surface would be coated and one of the side-edge(s) exposed to weather similarly coated with the composition to provide weather resistance protection of the relatively fragile underlying insulating board material both from weather or damage by handling and/or impact.

DESCRIPTION OF THE PREFERRED EMBODIMENTS

The following specific example illustrates various embodiments of the invention and methods of making and using same.

EXAMPLE 1

The Cementitious Slurry Coating Composition (1) First Wet Pre-Mix

The following composition is prepared:

|  |  | Parts by Weight |
|---|---|---|
| polymeric emulsion Rohm & Haas MC-76 (50% solids-acrylic polymer) hydroxyethyl cellulose 0.2 water 1.4 | *preliminary pre-mix | 81.6 1.6 |
| Alfol C$_{14-12}$ alcohols (Conoco) |  | 1.5 |
| Oxitol surfactant (Shell Chemical Co.) |  | 3.0 |
| Zonyl FSN surfactant (dupont) |  | 0.16 |
| Triton X-405 surfactant (Rohm & Haas) |  | 2.45 |

*Preliminary pre-mix prepared by dispersion in water

The first pre-mix is whipped or beaten to entrain air and produce a foam which has a density of from as low as 2 lbs/cu. ft. up to about 30 lbs/cu. ft., in this example 5 lbs/cu. ft.

(2) Second Dry Pre-Mix

A dry admixture is formed of 25 parts (by dry powder volume) portland cement and 50 parts (by volume) of flyash containing cenospheres (by volume 90%). The foregoing dry pre-mix is blended with the first wet pre-mix in the following proportions:

|  | Parts by Volume |
|---|---|
| Pre-mix (1) | 25* |
| Pre-mix (2) | 25 (cement) |
|  | 50 (flyash) |

(3) Foam Pre-Mix

A liquid foam is prepared by whipping a 2.5% (by volume) solution of WF-30F (ABEX Corp.) foaming agent. Twenty parts by volume of the foam mixture (300% air) is blended with 80 parts by volume of the blend of pre-mixes (1) and (2).

The mixture is applied as a wet slurry by a doctor to a ⅜" thickness on one surface of polystyrene bead board insulating sheet and permitted to cure seven days.

The following table will illustrate other related composition formulations in the wet slurry form prepared by the procedure of Example 1 without the addition of foams or the foaming of the first pre-mix. All examples contained about 0.1 to 0.2% by weight of the emulsion defoamer, NAPCONXZ from Diamond Shamrock Corporation, as required.

| EXAMPLES 2-7 | | | | | | |
|---|---|---|---|---|---|---|
| | FORMULA NO. | | | | | |
|  | 2 | 3 | 4 | 5 | 6 | 7 |
|  | Parts by Volume | | | | | |
| Flyash | 10 | 50 | 60 | 40 | 50 | 35 |
| Fiberglass | 30 | 10 | 5 | 20 | — | — |
| Portland Cement | 30 | 30 | 60 | 40 | 25 | 30 |
| Acrylic emulsion | 30 | 10 | 20 | 20 | 25 | 30 |
| Water | — | — | — | — | — | 5 |

The flyash used in the foregoing examples contained 90% cenospheres.

The foregoing compositions when applied to solid cellular foam insulating board (styrene beadboard), dried and cured, result in monolithic content board products having good insulating properties. Thus the board made by using the coating of Example 2 has very high impact resistance, the board of Example 3 high flame resistance, and the board of Example 4 very light weight. Example 5 represents coating for a board which will have overall good properties and is preferred for that reason. The composition of Example 6 may be used as a putty or filler between coated insulating sheets or applied to met other work. It is easily sanded or ground to shape in the dry, cured state and may be used in the manner of a body putty.

The following examples illustrate the preparation of special products using the coating compositions of the invention.

EXAMPLE 8

A one inch thick, 4×8 foot styrene beadboard was coated on both surfaces with the coating composition of of Example 1 in a thickness of ⅛". The coated board was dried and cured for seven days. The cured coated sheet had good resistance to moisture and flame and had good impact resistance and flexual strength.

EXAMPLE 9

A 1½" thick, 4×8 foot polystrene beadboard having a density of 1 lb./cu. ft. was coated with ¼" layer of the coating of Example 5. The coating on the board was dried in a forced air current (140° F.) until damp dry to the touch but still deformable with pressure. A wheel having a relief brick pattern was applied to the damp surface. The brick pattern on the board was permitted to dry and roller coated on the brick surface with a composition of Example 7 and containing 5% (by weight) added red brick dust pigment. The coated brick surface was dried and cured to produce a brick simulating exterior surface board.

EXAMPLE 10

A beam construction was formed by coating a 10' beam of 4×4" cross-section styrene beadboard with a ¼" layer of the coating composition of Example 2 and dried and cured for seven days. The beam showed good flexual strength, and excellent compressive strength in the lengthwise axis.

EXAMPLE 11

An insulation and construction board is prepared by coating the slurry composition of Example 7 at a thickness of 1/16 inch on one major surface of a styrene beadboard, measuring 1"×4'×8'. To the wet coating a 10 millimeter thick fiberglass swirl mat was applied that had previously been impregnated with a 50% solids acrylic polymer sold under the tradename MC-76 by Rohm & Haas Co. An additional 1/16" thick uniform layer of the slurry composition of Example 7 was sprayed on the wet composite and the resulting construction dried and cured for seven days. The dried and cured product displayed good impact and flexual strength.

I claim:

1. A method of forming an insulative construction monolith which comprises the following:
    (a) forming a liquid aqueous base cementitious slurry containing from 10 to 70 parts by volume of portland cement, 10 to 70 parts by volume of polymeric emulsion and 10 to 70 parts by volume of flyash containing from 5 to about 100 percent by volume of cenospheres;
    (b) applying a coating layer of said liquid slurry to at least one surface of a cellular insulating board monolith to form a composite; and
    (c) drying and curing said composite.
2. A method according to claim 1 which contains from 0 to 80 parts reinforcing fibers selected from the group consisting of fiber glass and organic polymeric fibers.
3. A method according to claim 1 wherein said slurry is prepared by the following:
    (a) foaming the polymeric emulsion to produce a foam having a density of from about 2 to 30 lbs/cu. ft. to form a first wet pre-mix;
    (b) forming a dry pre-mix of the portland cement and flyash and combining the same with the first wet pre-mix;
    (c) forming a liquid foam pre-mix by foaming from 10 to 30 parts by volume of liquid foaming agent which has been foamed to a volume of 1½ to 50 times the volume of the unfoamed liquid foaming agent;
    (d) combining said liquid foam from said step (c) with the combined pre-mixes of step (b) to form a low density coating composition;
    (e) applying a layer of said coating composition to at least one surface of a solid cellular insulating monolithic element; and
    (f) drying and curing said composite.
4. A method according to claim 3 wherein solid cellular insulating monolith is a styrene beadboard.
5. A method according to claim 3 wherein the coating layer of step (e) is a thickness of from about 1/16 to about ¾" thick.
6. A method according to claim 1 wherein the fiber glass reinforcing fibers are in the form of a fiberglass mat.
7. A method according to claim 1 which comprises the following:
    (i) applying a thin uniform layer of the liquid cementitious slurry of step (a) to at least one surface of a solid expanded styrene bead monolith;
    (i) impregnating a fiberglass continuous filament mat with polymeric emulsion and the said impregnated mat to the wet slurry coating applied in step (i) to form a first composite;
    (iii) applying a second thin uniform layer of the liquid slurry composition of step (a) over the fiberglass mat in the composite formed in step (ii) to form a second composite; and
    (iv) drying and curing the second composite.

* * * * *